United States Patent

[11] 3,630,670

[72] Inventors Norman Bell
Walnut Creek;
John Wesley Price, Pleasanton; Ronald James Rigge, Livermore, all of Calif.
[21] Appl. No. 39,958
[22] Filed May 25, 1970
[45] Patented Dec. 28, 1971
[73] Assignee Kaiser Aluminum & Chemical Corporation
Oakland, Calif.

[54] PSEUDOBOEHMITIC ALUMINA AND PROCESS FOR MAKING SAME
10 Claims, 2 Drawing Figs.

[52] U.S. Cl. .......................................................... 23/143, 252/463
[51] Int. Cl. .......................................................... C01b 7/34
[50] Field of Search ........................................... 23/143, 141; 252/463, 305

[56] References Cited
UNITED STATES PATENTS
3,532,457  10/1970  Koepernik ..................... 252/463 X
3,380,933  4/1968  Michel et al. .................. 252/463 X
3,411,878  11/1968  Graulier et al. ............... 23/143
2,657,115  10/1953  Ashley ........................... 23/143
2,980,632  4/1961  Malley et al. .................. 23/143

FOREIGN PATENTS
967,902  8/1964  Great Britain ................. 23/143

OTHER REFERENCES
Pappee, D., et al.; " Bulletin de la Societe Chimique de France"; 1958; pp. 1301– 1310 (in Sci. Library)

*Primary Examiner*—Oscar R. Vertiz
*Assistant Examiner*—G. O. Peters
*Attorneys*—James E. Toomey, Paul E. Calrow, Harold L. Jenkins and Andrew E. Barlay ABSTRACT: Alumina of substantially pseudoboehmitic structure is made by the reaction of an alkali aluminate solution with a mineral acid solution. The alumina produced is characterized by its low $Na_2O$ content of less than about 0.03 percent by weight, a pore size distribution wherein pores of sizes within the range of 120–800 A constitute a significant percentage of the total porosity.

PSEUDOBOEHMITIC ALUMINA AND PROCESS FOR MAKING SAME

NORMAN BELL,
JOHN W. PRICE &
RONALD J. RIGGE
INVENTORS

BY Andrew E Barley

ATTORNEY

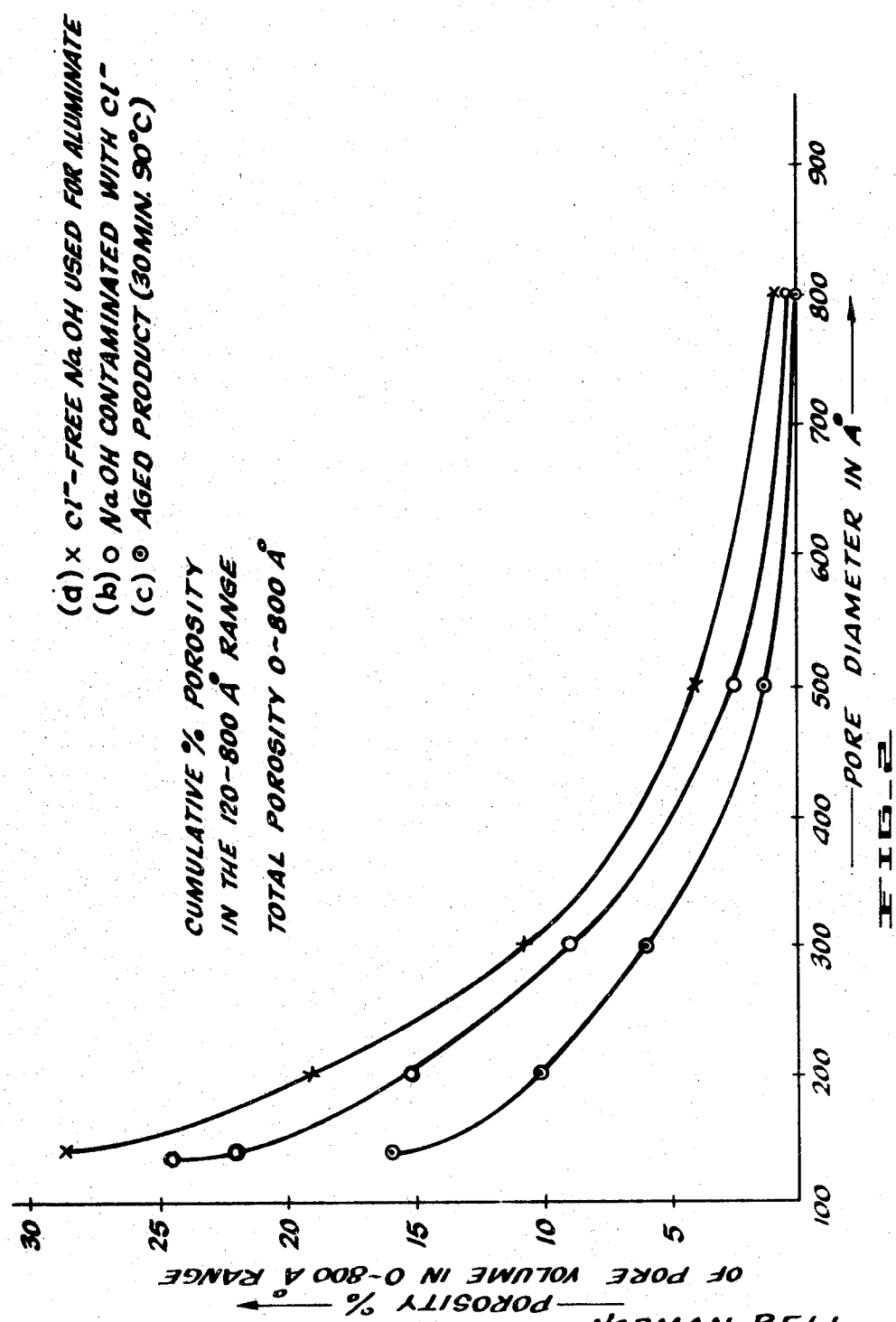

PSEUDOBOEHMITIC ALUMINA AND PROCESS FOR MAKING SAME

BACKGROUND OF THE INVENTION

This invention relates to a process for producing alumina of substantially pseudoboehmitic structure. More particularly, it concerns a continuous process wherein an alkali aluminate solution is reacted with a mineral acid solution in a first reactor from where the reaction mixture is introduced into a second reactor. In the second reactor a slurry of alumina is produced, a portion of which is recycled to the first reactor in a ratio of 0.1 to 3 volumes of recycle to 1 volume of combined sodium aluminate solution and mineral acid solution feed. The process results in a product of substantially pseudoboehmitic structure, an $Na_2O$ content of less than 0.03 percent by weight and wherein pores within the size range of 120–800 A constitute a significant portion of the total pore volume. The product exhibits a surface area of from about 200 to about 300 m.$^2$/g.

Gel-base aluminas have widespread utility in the manufacture of catalysts. They provide excellent catalyst precursors due to their relatively high surface area and other desirable properties, for example, relatively high pore volume and pore size.

Preparation of gel-base aluminas is usually accomplished by the reaction of an aluminum salt, for example, $Al_2(SO_4)_3$, with a base such as $NH_4OH$. Basic aluminum salts, such as alkali aluminates, have also been utilized for the preparation of gel-base aluminas; in these instances, an acid, for example HCl or $HNO_3$, is used as the precipitating agent. The reaction product, which in most cases is a gel-base alumina, is filtered, washed and subjected to aging. The aging treatment is generally accomplished at temperatures in excess of 60°–80° C., for time periods of 30 minutes or more, to alter the structure of the gel-base alumina. Alteration of the structure results in a crystalline product, for example boehmite, which is then subjected to several washing operations to remove $Na_2O$ impurities. The washed alumina, generally containing $Na_2O$ in amounts of about 0.05 percent by weight, is then dried and subsequently utilized as a catalyst base or substrate, or as filler in polymers, pigments, etc. Aging of the gel-base alumina was found to be necessary in order to enhance the removal of $Na_2O$ impurities; however, this aging treatment results in several undesirable changes in the physical structure and properties of the alumina. For example, aging converts a major portion of the alumina into a crystalline product, such as boehmite or bayerite, the properties of which are undesirable for many catalyst uses due to their microcrystalline structure. Further, aging also causes the collapse of pores, particularly those falling within the pore size range of 120–800 A, resulting in a product where most of the pores have pore sizes in the range of 20–100 A. Aluminas converted to microcrystalline products having pore sizes in the above mentioned low range are undesirable in the manufacture of catalysts, since in most instances catalysts are made by impregnation of the substrate with metallic salts with the goal to provide as much catalytic activity as possible. Surfaces of small pores, e.g., pore sizes in the range of 20–100 A, are generally difficult or impossible to coat with the catalytic agents. The surfaces of these small pores, because of lack of catalysts on their surfaces, have inferior catalytic properties. Thus, it is of importance to produce a catalyst precursor (1) which possesses a relatively high surface area and pores in the size range of 120–800 A constituting a significant portion of the total pore volume, (2) having a low $NA_2O$ content.

Surprisingly, it has now been discovered that all of these desirable properties can be achieved in an economical and efficient manner without resorting to aging or any other expensive and involved after treatments.

BRIEF SUMMARY OF THE INVENTION

An alumina of substantially pseudoboehmitic structure is made in a continuous manner by the reaction of an alkali-aluminate solution and a mineral acid solution which comprises reacting in a first reactor a sodium aluminate solution having an A/C ratio from about 0.7 to about 0.9, a caustic concentration from about 350 to about 650 grams per liter while maintaining the temperature of the reaction mixture within the range of about 30°–75° C,; removing the reaction mixture and introducing the same into a second reactor where a slurry is formed containing an alumina of substantially pseudoboehmitic structure while the reaction mixture is maintained under agitation in the second reactor within a temperature range of about 30°–75° C., for an average time period from about 10 to about 300 minutes. A portion of the slurry is recycled to the first reactor in a ratio of 0.1–3 volumes of slurry to 1 volume of combined sodium aluminate solution and mineral acid solution feed. The alumina of substantially pseudoboehmitic structure is recovered from the second reactor and, after drying, is characterized by a surface area of about 200–300 m.$^2$/g., an $Na_2O$ content of less than about 0.03 percent by weight, and by pores within the range of 120–800 A, which constitute a significant portion of the total pore volume.

BRIEF DESCRIPTION OF THE DRAWINGS

FIG. 2 is a graph comparing the pore size distribution of the alumina made by the novel process and an alumina prepared by prior art methods which include aging.

DETAILED DESCRIPTION OF THE INVENTION

Figure 1:
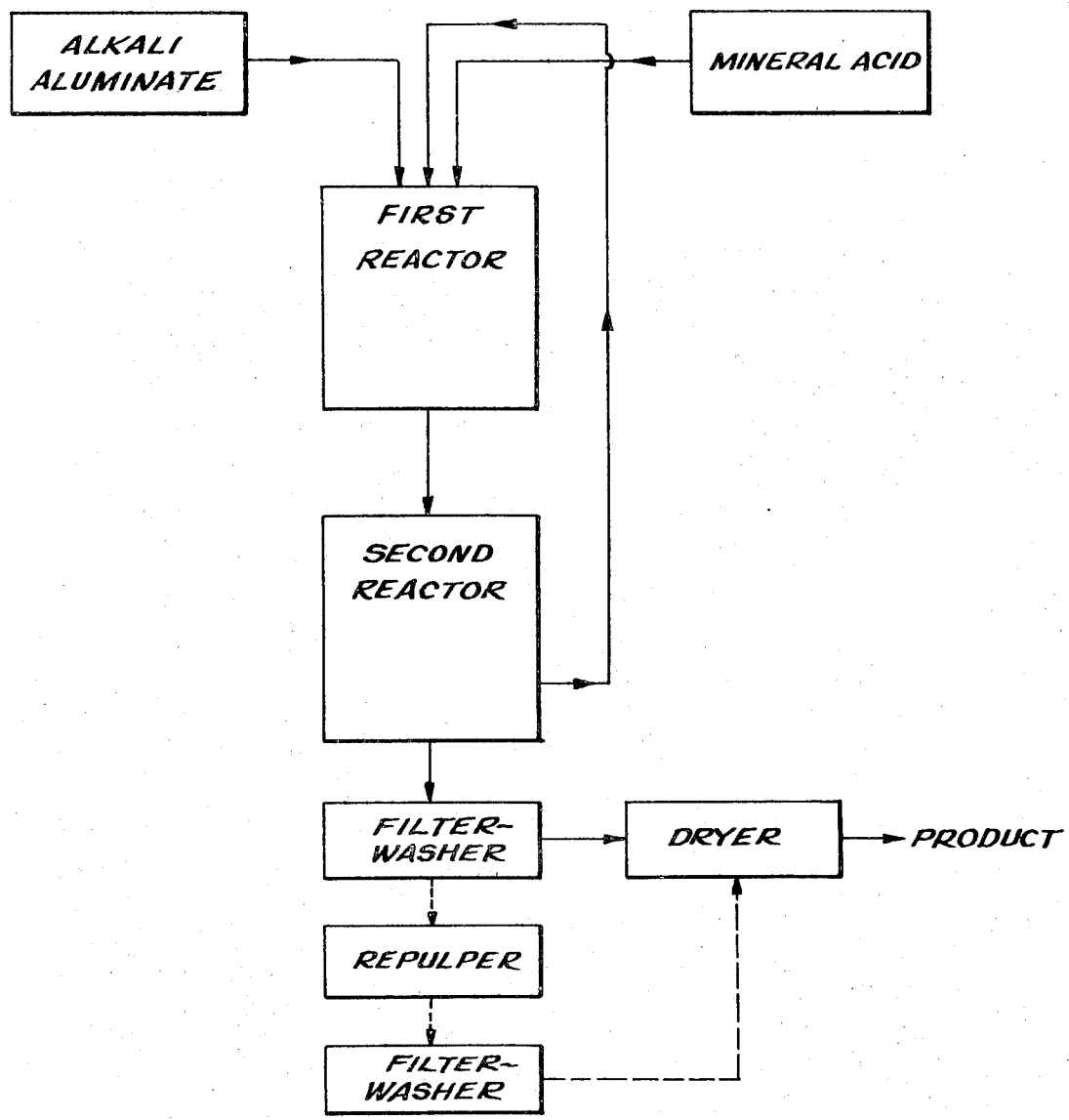
FIG. 1 is a diagram showing the steps of the novel process.

This invention relates to the preparation of alumina of substantially pseudoboehmitic structure. More particularly, it concerns a method of making an alumina in a continuous manner wherein an alkali aluminate solution is reacted in a first reactor with a mineral acid solution; the resulting reaction mixture being introduced into a second reactor where a slurry containing the alumina of substantially pseudoboehmitic structure is formed. A portion of the slurry from the second reactor is recycled to the first reactor in a ratio of from 0.1–3 volumes of recycle to 1 volume of combined alkali aluminate solution and mineral acid solution feed to the first reactor. The alumina recovered from the second reactor is characterized, after drying, by a relatively high surface area, a low $Na_2O$ content and a significant fraction of pore volume in the 120–800 A pore size range.

For the purposes of the present invention, the expression "substantially pseudoboehmitic structure" refers to an alumina dried at 140°–160° C. for a period of 1 hour; the so-dried alumina having a loss on ignition (LOI) at 1,000° C. for 1 hour from about 20 percent to about 50 percent by weight, a characteristic interplanar distance (020) of about 6.5–6.8 A; as determined by X-ray diffraction and a pseudoboehmite content at least about 92 percent by weight. In comparison, boehmite exhibits a characteristic interplanar distance (020) of about 6.15 A and essentially no X-ray diffraction in the 6.5–6.8 A range.

For the purposes of this invention, total porosity is defined as total volume of pores having pore diameters in the range of 0–800 A, expressed as cc./g. Percent porosity at a given pore diameter is therefore defined as $$100 \times \frac{porosity_d}{porosity\ (total)}$$

where $porosity_d$ is porosity at the given pore diameter.

The expressions "significant portion of pores" or "significant fraction of pores," as used herein in relationship to the volume of pores falling within the 120–800 A pore size range, refer to the alumina product of the present invention wherein at least 20 percent of the total pore volume consists of pores within the 120–800 A pore size range.

According to the process of the invention, an alkali aluminate solution is used in the preparation of the alumina. Alkali aluminate solutions containing either sodium aluminate or potassium aluminate can be utilized. It is, however, preferred to use a sodium aluminate solution for the purposes of this invention. Sodium aluminate solutions can be conveniently obtained by dissolving, for example, alumina trihydrate, such as produced by the Bayer process, in a sodium hydroxide solution; or directly from the Bayer process, in which an aluminous ore, such as bauxite, is digested with a caustic solution, generally a sodium hydroxide solution, resulting in a sodium aluminate solution after separation of the insoluble components present in the aluminous ore. Regardless of the source, it is of importance to employ a sodium aluminate solution, where the $Al_2O_3$ and the concentration expressed in $Na_2CO_3$ equivalents per liter is maintained within limits given below in order to achieve the production of the alumina product of the invention.

It was found that good results can be obtained when sodium aluminate solutions are used containing from about 280 to about 530 grams per liter of $Al_2O_3$ and a caustic concentration from about 350 to about 650 grams per liter calculated as $Na_2CO_3$. Within the ranges given for both the alumina ($Al_2O_3$) and the caustic ($Na_2CO_3$), an alumina to caustic weight ratio (usually designated as A/C) from about 0.7 to about 0.9 is preferred. For best results, A/C ratios of 0.75–0.85 are recommended.

The mineral acid solutions to be utilized for the present process include nitric acid, sulfuric acid and hydrochloric acid solutions, nitric acid being preferred. The concentration of the nitric acid to be used in the process of producing the alumina of the invention is between about 5–20 percent $HNO_3$ by weight, the range of 8–12 percent by weight being associated with best results.

The quantity of nitric acid solution to be used in the production of the alumina is generally equal to about the stoichiometric quantity required for the complete neutralization of the sodium aluminate, the preferred range being 0.98–1.00 equivalents of nitric acid per equivalent of sodium aluminate.

In the process of the invention, the sodium aluminate solution and the nitric acid solution are introduced into a first reactor where admixture of the two reactants will take place. The rate of introduction of the individual reactants is controlled in a manner described in detail below so as to obtain an effluent containing from about 20 to about 50 grams per liter $Al_2O_3$. The first reactor can be a simple mixing vessel equipped with cooling means and care is to be taken to insure that the temperature of the admixture in this mixing vessel or device is maintained within the temperature range of about 30°–75 C. The average residence time of the reaction mixture in the mixing vessel is of importance, and generally mixing periods less than about 1 minute, preferably less than 20 seconds, are preferred. To accomplish the mixing within a relatively short time, an in-line mixer can be utilized with good results. The in-line mixer, which is generally equipped with an inlet for the sodium aluminate solution and an inlet for the nitric acid solution, should also be equipped with an additional inlet, close to the reactant inlets, for purposes described hereinafter. The reaction mixture is generally removed from the in-line mixer at a point remote from the inlets to allow thorough mixing of the reactants prior to exit from the mixer. Rapid, continuous mixing can be obtained in any suitable vessel provided complete admixture is achieved within the recommended relatively short mixing periods. It is not intended to restrict the present process to the use of an in-line mixer, which is only a representative mixing device, capable of achieving the desired effect.

The admixture or reaction mixture is continuously removed from the first reactor and is introduced into a second reactor or vessel. This second reactor is generally of larger size than the first reactor and the reaction mixture is kept in this vessel for an average residence time from about 10 to about 300 minutes, preferably between 40–120 minutes. Temperatures within the range of about 30°–75° C., are maintained in this reactor and the contents of the reactor are preferably kept under agitation by any suitable device. The pH in this reactor is kept below about 7, preferably between 6 and 7. In this vessel a slurry will form comprising an alumina of substantially pseudoboehmitic structure.

In order to achieve the production of an alumina of low soda content with the described desired properties, a portion of the slurry is recycled from the second reactor to the first reactor or mixer.

Surprisingly, it has been discovered that by controlling the ratio of recycle flow to reactant flows, the pore size of the final product can be controlled within desired ranges. For example, it has been found that recycle volumes from about 0.1 to about 3 per volume of combined feed of sodium aluminate and nitric acid solutions, i.e., recycle ratios from about 0.1 to about 3 in relation to combined feed volumes, provide an unexpected method of controlling the average porosity of the alumina within the limits of about 0.1–0.5 cc./g. Thus, if the recycle ratio is between about 0.1 and about 1.5 at constant rates of feeds of reactants, this results in a final product having a pore volume within the range of about 0.1–0.3 cc./g. in the 120–800 A pore size range. Recycle ratios between 1.5 and 3, under otherwise similar process conditions, result in a product having a pore volume within the range of about 0.3–0.5 cc./g. for pores in the same 120–800 A range. It can therefore be seen that the recycle allows controlled variation of the average pore volume of the resultant product within the range of about 0.1–0.5 cc./g.

The rate of sodium aluminate feed and nitric acid feed is controlled together with the recycle in a manner so as to obtain an effluent from the first reactor containing from about 20 to about 50 g./l. total alumina calculated as $Al_2O_3$. The slurry formed in the second reactor or vessel will have correspondingly an $Al_2O_3$ content of from about 20 to about 50 g./l. It is preferred to control both the feed and the recycle ratio in a manner to obtain an $Al_2O_3$ content of from about 25 to about 45 g./l. in the effluent.

The slurry from the second reactor containing the alumina is continuously removed from the vessel after an average residence time from about 10 to about 300 minutes, preferably 40–120 minutes. The pH in this reactor is kept at about 7 or below to avoid aging, preferably between 6 and 7. The slurry is conveniently filtered, for example, on a belt filter, to a solids content of about 8–20 percent by weight of $Al_2O_3$. If the sodium aluminate solution was prepared from alumina trihydrate and sodium hydroxide, free of chloride impurities, washing with deionized water is sufficient to remove $Na_2O$ impurities from the alumina and to obtain a product containing less than 0.03 percent by weight of $Na_2O$, generally less than 0.01 percent $Na_2O$. If, however, the sodium hydroxide contained chloride impurities resulting from the preparation of the NaOH by electrolysis of NaCl, it may be desired to subject the filter cake of alumina to an additional purification step to remove the chloride impurities. This can be accomplished in accordance with the invention by repulping the alumina filter cake with de-ionized water to a slurry containing from about 4 to about 8 percent by weight of $Al_2O_3$ and by the addition of a small amount of $NH_3$ or $NH_4OH$. The amount of $NH_3$ or $NH_4OH$ added depends on the amount of chloride impurity present. Under normal conditions when a commercial grade of NaOH is used for the preparation of the sodium aluminate solution, $NH_3$ amounting to about 1.5–3.0 weight percent of the $Al_2O_3$ content of the slurry, or an equivalent quantity of aqueous ammonia, is added. The repulped alumina is kept under agitation at a relatively low temperature, usually below about 60° C. for a short period of time, generally for an average residence time of about 30 minutes or less, preferably less than 5 minutes, to avoid aging of the alumina and the resultant decrease in the pore size in the desired pore size range of 120–800 A.

The treated alumina is then filtered, washed with deionized water to remove surface sorbed ammonium chloride. Generally one or two washes of the treated alumina was found to be sufficient. The washing is most conveniently accomplished during continuous filtration, but if desired the $NH_3$-treated filter cake can be repulped.

The washed alumina, whether treated with NH$_3$ or not, is then subjected to a drying operation. Drying of the alumina can be accomplished in any desired manner. One convenient method is to subject the wet alumina to a spray-drying operation in conventional spray-drying equipment, wherein hot gases, usually at temperatures of about 500°–600° C., are introduced and contacted with the wet alumina or slurry.

The dried product produced in accordance with the process described hereinbefore is an alumina, having a substantially pseudoboehmitic structure, a loss on ignition (LOI) from about 20 to about 50 percent by weight, and a significant portion of pores in the 120–800 A range; generally at least about 20 percent of the total pores are in the 120–800 A range.

Referring now to the drawings, FIG. 1 shows schematically the process of the present invention, wherein alumina of substantially pseudoboehmitic structure and low soda content is produced and wherein the alumina has a significant fraction of pores in the 120–800 A pore size range. It can be seen that the alumina produced in the second reactor can be directly subjected to drying after washing of the filter cake without an aging treatment to obtain the desired product. Further, in this Figure, the dotted lines denote process steps which are only necessary if the NaOH used for making the sodium aluminate solution contained chloride impurities.

FIG. 2 graphically compares the pore size distribution in percent in the 120–800 A pore size range for the product of the invention (a) when chloride-free NaOH is used, (b) when the NaOH contained chloride impurities and an NH$_3$ after-treatment. It is clear from this Figure that the products of the present invention have a significantly higher percentage of pores in the 120–800 A range, and at various sizes within this range, than the prior art product subjected to aging. For purposes of comparison, Samples (a) and (b) shown in FIG. 2 were prepared by the process of the invention, while Sample (c) was prepared in accordance with the process described in U.S. Pat. No. 3,268,295 to Armbrust et al. (Aug. 23, 1966).

The following examples further illustrate the novel process of the present invention:

EXAMPLE I

A sodium aluminate solution was prepared by at first dissolving NaOH (c.p. grade) in water to provide a sodium hydroxide solution containing about 40 percent by weight NaOH. This sodium hydroxide solution was used to dissolve alumina hydrate, such as produced in the Bayer process, to provide a sodium aluminate solution containing about 396 g./l. NaOH (equivalent to 525 g./l. Na$_2$CO$_3$) and 446 g./l. Al$_2$O$_3$. The A/C ratio was about 0.85, calculated by the following formula:

$$\frac{A}{C} = \frac{\text{Alumina g./l. (Al}_2\text{O}_3\text{)}}{\text{Caustic g./l. expressed as g./l. equiv. Na}_2\text{CO}_3} = \frac{446}{525} = 0.85$$

The nitric acid solution used in the reaction was prepared by diluting commercial grade concentrated nitric acid with water to an HNO$_3$ concentration of about 10 percent by weight. The temperature of both the sodium aluminate solution and the nitric acid solution was adjusted to about 50° C. and the two solutions were continuously but separately introduced into a first reactor comprising an in-line mixer-blender equipped with two flat-bladed paddle-type impellers capable of mixing speeds up to about 1,750 r.p.m. without load. The mixer-blender had a capacity of 1.8 liter. The admixed reactants were continuously removed from the first reactor after a residence time of about 15 seconds and introduced into a second reactor comprising a stirred vessel, where the admixture was maintained under agitation for an average residence time of about 40 minutes, which allowed the formation of a slurry containing alumina hydrate. Continuously, a portion of the slurry from the second reactor was recycled to the in-line mixer-blender in a ratio of about 2.5 volumes of recycle per volume of combined feed of sodium aluminate and nitric acid solutions. The feed rate of the nitric acid was controlled in a manner as to provide the stoichiometrically required amount of nitric acid to neutralize the sodium aluminate. The total combined feed rate of sodium aluminate solution, recycle slurry and nitric acid solution to the first reactor was adjusted to obtain an Al$_2$O$_3$ concentration of about 3.8 percent by weight in the first reactor. The temperature within the first reactor was kept at about 50° C. and the pH of the effluent from the first reactor was measured to be about 8.5. Another portion of the slurry formed in the second reactor was continuously removed and filtered on an in-line filter and the filter cake was washed with tap water, followed by vacuum dewatering of the washed cake. The dewatered alumina containing about 96 percent by weight of pseudoboehmite was analyzed for Na$_2$O and it was found to contain about 0.02 percent by weight of Na$_2$O calculated on the basis of the Al$_2$O$_3$ content of the alumina. The dewatered alumina was then repulped to a solids content of about 15 percent by weight and continuously introduced into a spray drier of a spinning disc cocurrent flow type. The drying gas temperature, introduced into the drier, was kept at about 500°–600° C. and the temperature of the gases exiting from the drier was measured to be about 100°–170° C. The product from the spray drier had a loss on ignition of about 25 percent by weight.

The spray-dried product was further analyzed to determine the pore volume in the 120–800 A pore size range, the pore size distribution of the product, the bulk density, X-ray diffraction pattern, surface area and absolute density.

Pore Volume and Pore Size Distribution

Pore volume penetrated by mercury was determined at a series of increasing pressures of mercury and the minimum diameter of pores thus penetrated at each pressure was determined by a standard calculation relating pore diameter, surface tension of mercury, and mercury contact angle, with applied pressure. The total pore volume penetrated at each pressure was determined by standard measurements of electrical capacitance of the alumina sample containing mercury.

By these methods the pore volume of pores within the pore diameter range of 120–800 A was found to be 0.33 cc./g., and it was found that about 30 percent of the pores fell within this same range of pore diameters.

These data were converted to cumulative pore volumes penetrated by mercury, to obtain the curves of FIG. 2.

Bulk Density

The spray-dried material exhibited a bulk density of about 300 kg./m$^3$.

X-ray Diffraction Pattern

The spray-dried product was subjected to X-ray diffraction analysis using copper K $\alpha$-radiation and the $d$ spacing of the product was determined. It was found that the diffraction peak of the greatest intensity (I/Io) was at 6.5–6.8 angstrom units, indicating that the product contains substantial quantities of pseudoboehmite. The area under the 14.5°, 2$\theta$ diffraction peak for pseudoboehmite was measured and according to accepted practice was compared to the area of a standard boehmite peak (ASTM diffraction data card 5-0190). This comparison indicated the presence of practically no boehmite and a pseudoboehmite content of about 96 percent by weight.

Surface Area

The surface area was determined by the standard B.E.T. method (Brunauer-Emmett-Teller), using nitrogen. The surface area of the pseudoboehmite produced was in the range of 200–300 m.$^2$/g.

Absolute Density

The absolute density of the material prepared as described above was found to be about 3.0 g./ml. The pseudoboehmitic product was found to have only a minor number of voids which were inaccessible to the catalyst composition during impregnation.

EXAMPLE II

The production of alumina as described in example I was repeated with the following exception: The slurry recycle ratio was maintained at 1, i.e., 1 volume of recycle was used to 1 volume of combined sodium aluminate and nitric acid solution feed.

The pseudoboehmite obtained analyzed as follows, after spray drying:

$Na_2O$ content—0.02 percent by weight of $Al_2O_3$; pore volume—0.2 cc./g. in the 120–800 A pore size range; pore size distribution in percent in the 120–800 A range—28 percent; bulk density—330 kg./m.$^3$; pseudoboehmite content—95 percent by weight of sample; surface area—250 m.$^2$/g.; absolute density—3.2 g./ml.

EXAMPLE III

For this example, commercial grade sodium hydroxide was used for the preparation of the alumina. The sodium hydroxide contained about 1 percent by weight of chloride impurity in the form of NaCl. The details of this example are identical to example I, down through the filtration of the slurry from the second reactor and washing of the filter cake. The filter cake, instead of being spray dried, was repulped in a stirred vessel in deionized water to a solids content of about 4 percent and heated to about 65° C. and held at this temperature for an average residence time of about 30 minutes. After this holding period, approximately 0.3–0.45 g./l. $NH_4OH$ solution (30 percent by weight), equivalent to about 1.5–2 percent by weight of $NH_4OH$ calculated on the basis of the $Al_2O_3$ content, was admixed with the slurry. The admixture was then filtered on a belt filter, washed with deionized water of about 70° C. The washed filter cake was then repulped to a solids content of about 5 percent by weight and subjected to spray drying in a manner shown in example I. The spray-dried product was analyzed with the following results: Cl$^-$ content—0.06 percent by weight of $Al_2O_3$; $Na_2O$ content—0.01 percent by weight of $Al_2O_3$; pore volume—0.33 cc./g. in the 120–800 A range; pore size distribution in percent in the 120–800 A range—24; bulk density—300 kg./m.$^3$; pseudoboehmite content—95 percent by weight of sample; surface area—240 m.$^2$/g.; absolute density—3.1 g./ml. It can thus be seen that the chloride removal treatment only moderately affected the pore size distribution in the important 120–800 A range. This is shown as sample (b) in FIG. 2.

EXAMPLE IV

A sodium aluminate solution was prepared in accordance with example I of U.S. Pat. No. 3,268,295—Armbrust et al., wherein the sodium aluminate solution was neutralized with carbon dioxide gas at pH 10.5. The slurry was vacuum filtered and the resulting cake was given three displacement washes of demineralized water of about 65° C. The filter cake was reslurried in deionized water, the temperature was raised to about 86° C. and maintained at this temperature for about 30 minutes. The aged slurry was filtered, washed and spray-dried. The pore size distribution was then measured and the pore size distribution in the 120–800 A range was shown in percent as sample (c), in FIG. 2.

The description of the invention utilized specific reference to certain process details; however, it is to be understood that such details are illustrative only and not by way of limitation. Other modifications and equivalents of the invention will be apparent to those skilled in the art from the foregoing description.

What is claimed is:

1. A process for producing alumina of substantially pseudoboehmitic structure and low soda content which comprises
   a. introducing into a first reactor an aqueous sodium aluminate solution having an A/C ratio from about 0.7 to about 0.9, a total caustic concentration from about 350 to about 650 grams per liter calculated as $Na_2CO_3$ and an aqueous nitric acid solution having an $HNO_3$ concentration from about 50 to about 200 grams per liter, while maintaining the temperature of the reaction mixture between about 30° and about 75° C., the quantity of nitric acid introduced being about the stoichiometric amount required to react with the sodium aluminate;
   b. removing the reaction mixture from the first reactor and introducing it into a second reactor where it is maintained under agitation at a temperature from about 30° to about 75° C. for an average residence time from about 10 to about 300 minutes at a pH of about 7 to form a slurry containing alumina hydrate of substantially pseudoboehmitic structure;
   c. recycling a portion of the slurry from the second reactor to the first reactor in a ratio of from about 0.1 to about 3 volumes of slurry to 1 volume of combined sodium aluminate solution and nitric acid solution feed;
   d. removing another portion of the slurry from the second reactor, filtering and washing the resultant filter cake, and then drying to recover the alumina of substantially pseudoboehmitic structure.

2. Process according to claim 1, wherein the recycle to feed ratio is between about 0.1 and 1.5 to produce a pseudoboehmitic alumina having an average pore volume in the 120–800 A pore size range of about 0.1 to about 0.3 cc./g.

3. Process according to claim 1, wherein the recycle to feed ratio is between about 1.5 and 3.0 to produce a pseudoboehmitic alumina having an average pore volume in the 120–800 A pore size range of about 0.3 to about 0.5 cc./g.

4. Process according to claim 1, wherein the pH in the second reactor is between about 6 and 7.

5. Process according to claim 1, wherein the average residence time of the slurry in the second reactor is about 40 to about 120 minutes.

6. A process for producing alumina of substantially pseudoboehmitic structure and low soda content which comprises
   a. introducing into a first reactor an aqueous sodium aluminate solution having an A/C ratio from about 0.7 to about 0.9, a total caustic concentration from about 350 to about 650 grams per liter calculated as $Na_2CO_3$ and an aqueous nitric acid solution having an $HNO_3$ concentration from about 50 to about 200 grams per liter while maintaining the temperature of the reaction mixture between about 30° and about 75° C., the quantity of nitric acid introduced being about the stoichiometric amount required to react with the sodium aluminate;
   b. removing the reaction mixture from the first reactor and introducing it into a second reactor where it is maintained under agitation at a temperature from about 30° to about 75° C. for an average residence time from about 10 to about 300 minutes at a pH of about 7 to form a slurry containing alumina hydrate of substantially pseudoboehmitic structure;
   c. recycling a portion of the slurry from the second reactor to the first reactor in a ratio of from about 0.1 to about 3 volumes of slurry to 1 volume of combined sodium aluminate solution and nitric acid solution feed;
   d. removing another portion of the slurry from the second reactor and filtering the slurry to a solids content from about 8 to about 20 percent be weight;
   e. repulping the formed filter cake with water to obtain a solids content of from about 4 to about 8 percent by weight and adding a compound selected from the group consisting of $NH_3$ and $NH_4OH$ in an amount equivalent to from about 1.5 to about 3.0 by weight of $NH_4OH$ on the weight basis of $Al_2O_3$ of the pulp and maintaining the pulp under agitation at a temperature at about 60° C. or below for a time period of less than about 30 minutes; and
   f. filtering the pulp, washing the filter cake and recovering the alumina of substantially pseudoboehmitic structure.

7. Process according to claim 6, wherein the recycle to feed ratio is between about 0.1 and 1.5 to produce a pseudoboehmitic alumina having an average pore volume in the 120–800 A pore size range of about 0.1 to about 0.3 cc./g.

8. Process according to claim 6, wherein the recycle to feed ratio is between about 1.5 and 3.0 to produce a pseudoboehmitic alumina having an average pore volume in the 120–800 A pore size range of about 0.3 to about 0.5 cc./g.

9. Process according to claim 6, wherein the pH in the second reactor is between about 6 and 7.

10. Process according to claim 6 wherein the average residence time of the slurry in the second reactor is from about 40 to about 120 minutes.

* * * * *

UNITED STATES PATENT OFFICE
CERTIFICATE OF CORRECTION

Patent No. 3,630,670      Dated December 28, 1971

Inventor(s) Norman Bell et al.

It is certified that error appears in the above-identified patent and that said Letters Patent are hereby corrected as shown below:

Column 2, line 4, "liter while maintaining" should read -- liter calculated as $Na_2CO_3$, with a dilute nitric acid solution having an $HNO_3$ concentration from about 50 to about 200 grams per liter while maintaining --; line 60, "cc.g/g" should read -- cc./gm --.

Signed and sealed this 4th day of July 1972.

(SEAL)
Attest:

EDWARD M. FLETCHER, JR.      ROBERT GOTTSCHALK
Attesting Officer      Commissioner of Patents